United States Patent
Nakama et al.

(10) Patent No.: US 7,609,416 B2
(45) Date of Patent: Oct. 27, 2009

(54) IMAGING APPARATUS

(75) Inventors: Satoshi Nakama, Kanagawa (JP);
Shinichi Koyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/410,263

(22) Filed: Apr. 10, 2003

(65) Prior Publication Data

US 2003/0202216 A1 Oct. 30, 2003

(30) Foreign Application Priority Data

Apr. 30, 2002 (JP) ............................. 2002-129084

(51) Int. Cl.
*H04N 1/21* (2006.01)
*H04N 1/23* (2006.01)
(52) U.S. Cl. ...................... 358/302; 358/1.16; 358/444
(58) Field of Classification Search ................. 358/296, 358/302, 1.16, 1.17, 444; 320/134, 136
See application file for complete search history.

(56) References Cited

U.S. PATENT DOCUMENTS 5,448,306 A 9/1995 Koyama ..................... 348/678
5,774,192 A 6/1998 Koyama ..................... 348/715
5,964,851 A * 10/1999 Ueda ............................ 710/17
6,831,444 B2 * 12/2004 Kobayashi et al. .......... 320/136
2002/0067515 A1 * 6/2002 Abe ............................. 358/442
2002/0102095 A1 8/2002 Koyama ..................... 386/96

FOREIGN PATENT DOCUMENTS

| JP | 2000-259293 | 9/2000 |
| JP | 2000-278311 | 10/2000 |
| JP | 2001-339771 | 12/2001 |

* cited by examiner

*Primary Examiner*—Thomas D Lee
(74) *Attorney, Agent, or Firm*—Fitzpatrick, Cella, Harper & Scinto

(57) ABSTRACT

An imaging apparatus includes a register, a communication unit, a control unit and a display unit. The communication unit receives a write request from an external storage device, the write request being used to write battery capacity information and storage capacity information in the register. The control unit (a) obtains the battery capacity information and the storage capacity information from the register if the start of imaging is detected, (b) detects a condition of a battery of the external storage device using the battery capacity information obtained from the register, and (c) detects a condition of the storage capacity of the external storage device using the storage capacity information obtained from the register. The display unit displays the condition of the battery detected by the control unit, and displays the condition of the storage capacity detected by the control unit.

6 Claims, 5 Drawing Sheets

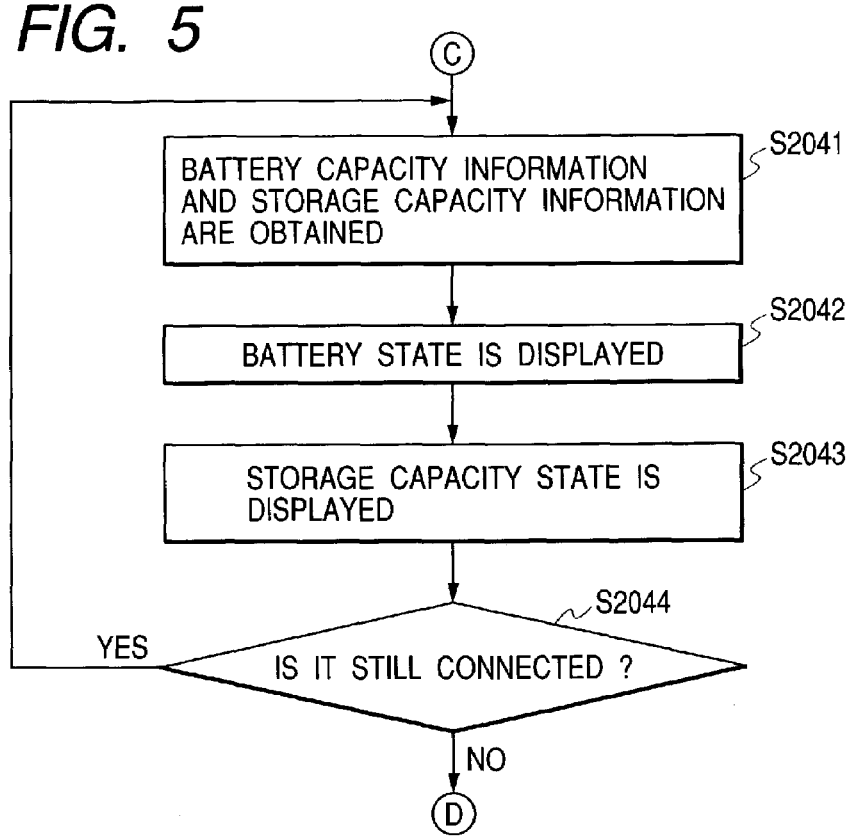
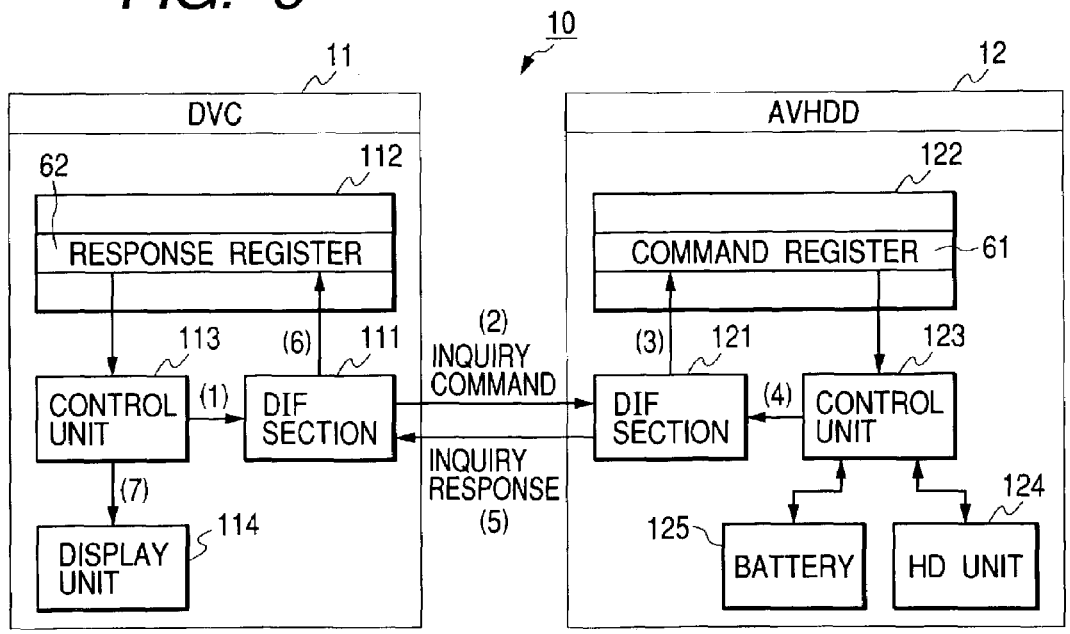

IMAGING APPARATUS

BACKGROUND OF THE INVENTION

1. Field of the Invention

The present invention relates to an imaging apparatus for storing photo-taken image in an external storing device.

2. Related Background Art

A digital video camera normally records a photo-taken image on a storing medium such as a cassette tape, a memory card or the like and can also store the photo-taken image in an external storing device connected to an IEEE 1394 interface.

However, conventional digital video cameras did not have a function for acquiring information regarding a battery and a storage capacity of an external storing device from the external storing device and a function for displaying conditions of the battery and the storage capacity of the external storing device. Thus, the information regarding the battery and the storage capacity of the external storing device was displayed on the external storing device rather than the digital video camera. With this arrangement, when it is desired that the conditions of the battery and the storage capacity of the external storing device be ascertained during the imaging or photo-taking, since the user must look up from a subject, there is a problem that proper imaging cannot be performed.

Further, if the ascertainment of the conditions of the battery and the storage capacity of the external storing device are neglected, there is a problem that the imaging cannot be performed because the battery of the external storing device is suddenly exhausted or that the imaging cannot be performed because the storage capacity of the external storing device is suddenly used up.

SUMMARY OF THE INVENTION

The present invention can permit the user to recognize conditions of a battery and a storage capacity of an external storing device to prevent recording of a photo-taken image from becoming impossible.

According to one aspect of the present invention, there is provided an imaging apparatus comprising transmission means for sending command for inquiring of an external storing device about battery capacity information as information regarding a battery of the external storing device and for receiving response including the battery capacity, and display means for displaying a condition of the battery of the external storing device.

According to another aspect of the present invention, there is provided an imaging apparatus comprising transmission means for sending command for requesting storage capacity information as information regarding a storage capacity of an external storing device and for receiving response including the storage capacity information, and display means for displaying a condition of the storage capacity of the external storing device.

According to a further aspect of the present invention, there is provided an imaging apparatus comprising transmission means for sending read request for requesting reading-out of a register storing battery capacity as information regarding a battery of an external storing device to the external storing device and for receiving read response including the battery capacity information, and display means for displaying a condition of the battery of the external storing device.

According to a still further aspect of the present invention, there is provided an imaging apparatus comprising transmission means for sending read request for requesting reading-out of a register storing storage capacity information as information regarding a storage capacity of an external storing device to the external storing device and for receiving read response including the storage capacity information, and display means for displaying a condition of the storage capacity of the external storing device.

According to a further aspect of the present invention, there is provided an imaging apparatus comprising receiving means for receiving write request for requesting writing-in of battery capacity information in a register storing the battery capacity information as information regarding a battery of an external storing device, and display means for displaying a condition of the battery of the external storing device.

According to a still further aspect of the present invention, there is provided an imaging apparatus comprising receiving means for receiving write request for requesting writing-in of storage capacity information in a register storing the storage capacity information as information regarding a storing capacity of an external storing device, and display means for displaying a condition of the storage capacity of the external storing device.

Still other objects, features and advantages of the present invention will become fully apparent from the following detailed description of the preferred embodiments.

BRIEF DESCRIPTION OF THE DRAWINGS

FIG. 5 is a flow chart showing a processing procedure of a WT system;

FIG. 6 is a view for explaining the FCP system;

DESCRIPTION OF THE PREFERRED EMBODIMENTS

The present invention will now be explained in connection with preferred embodiments thereof with reference to the accompanying drawings.

First of all, a digital video camera system 10 as an image recording apparatus according to an embodiment of the present invention will be explained with reference to FIG. 1.

Figure 1:
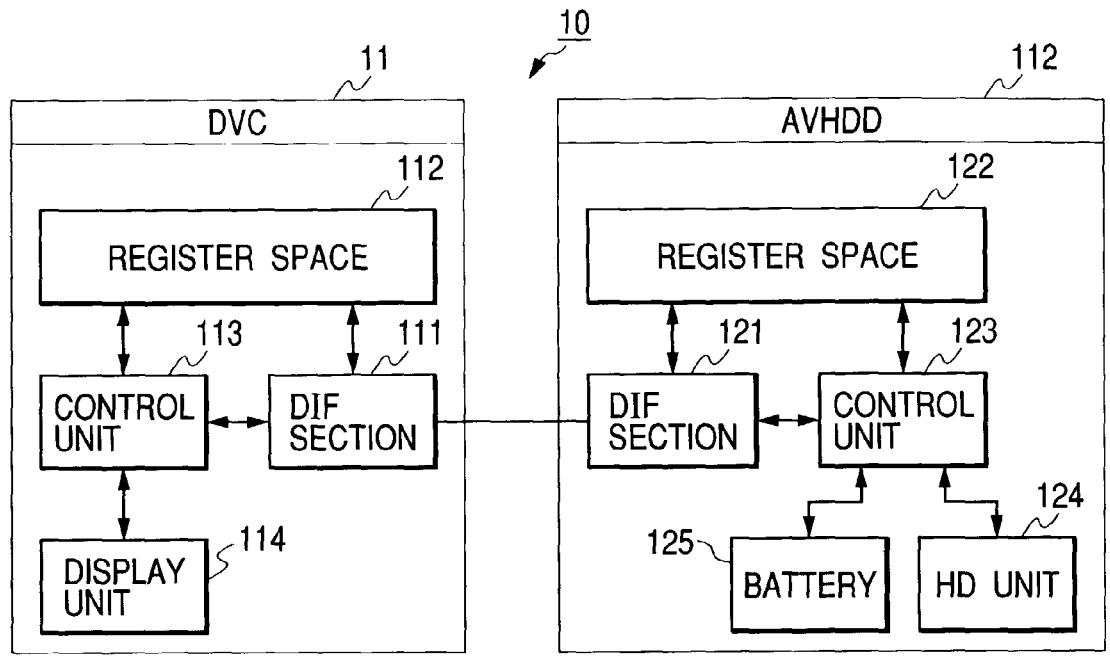
FIG. 1 is a block diagram showing a schematic construction of a digital video camera system according to an embodiment of the present invention.
Figure 2:
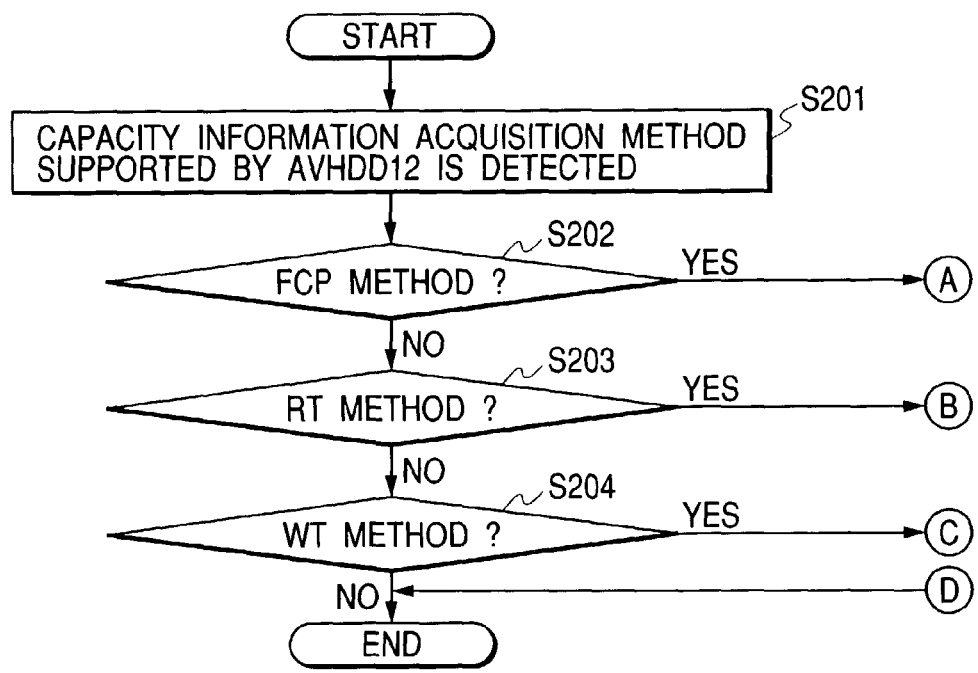
FIG. 2 is a flow chart for showing a processing procedure of the digital video camera system of FIG. 1.
Figure 3:
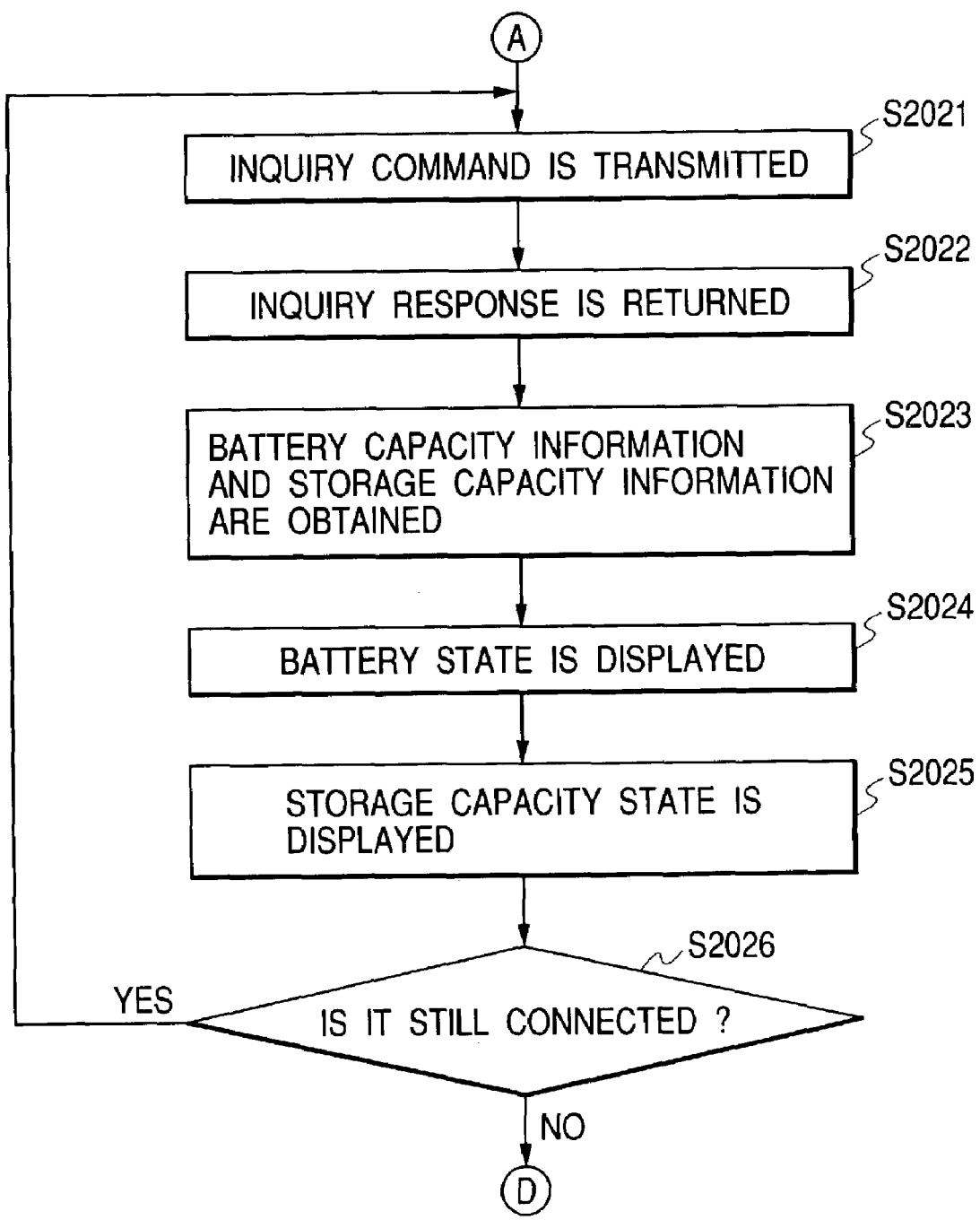
FIG. 3 is a flow chart for showing a processing procedure of an FCP system.
Figure 4:
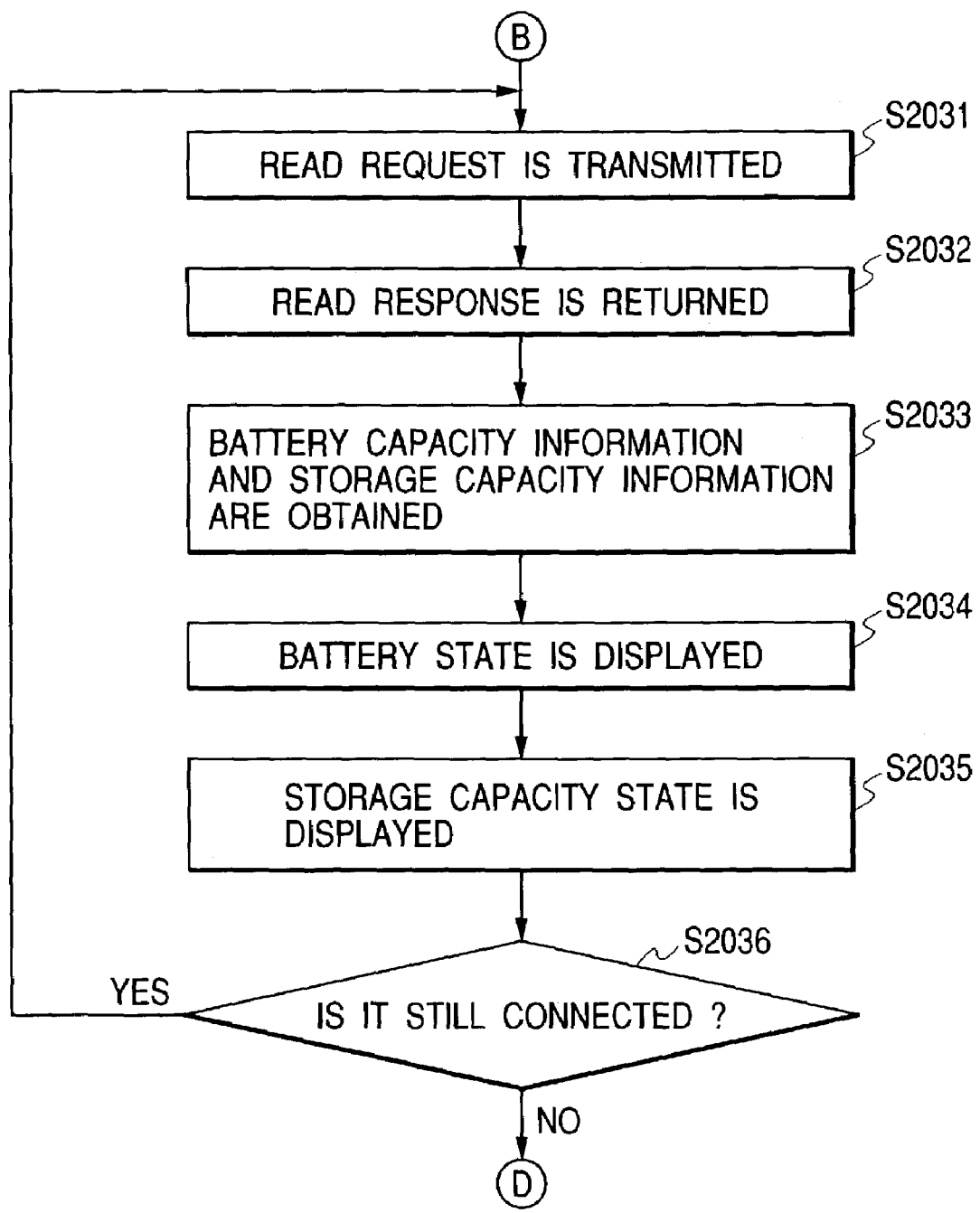
FIG. 4 is a flow chart for showing a processing procedure of an RT system.

As shown in FIG. 1, the digital video camera system 10 includes a digital video camera (referred to as "DVC" hereinafter) 11 and an AV hard disk device (referred to as "AVHDD" hereinafter) 12. The DVC 11 is an imaging apparatus according to the embodiment and the AVHDD 12 is an external storing device according to the embodiment. When the AVHDD 12 is connected to the DVC 11, the DVC 11 can record a photo-taken image on the AVHDD 12.

As shown in FIG. 1, the AVHDD 12 includes a digital interface section (referred to as "DIF section" hereinafter) 121, a register space 122, a control unit 123, a hard disk unit 124 and battery 125.

The DIF section 121 is a digital interface conforming to IEEE Std 1394-1995 as one of standards regarding a serial bus and standards (IEEE Std 1394a-2000 and the like) associated with such a standard.

The register space 122 is a part of a CSR (control and status register) architecture stipulated in ISO/IEC 13213:1994 and serves to store information regarding the AVHDD 12. Further, the register space 122 has a command register if the AVHDD 12 supports an FCP system which will be described later and a BSR register if the AVHDD supports an RT system which will be described later.

The control unit 123 includes a microcomputer and a memory. A control program for controlling various functions of the DVC 11 is stored in the memory of the control unit 123. A control program for controlling a processing procedure of the AVHDD 12 which will be described with reference to FIGS. 2 to 8 is also stored in the memory of the control unit 123.

Further, the control unit 123 has a function for managing latest battery capacity information and storage capacity information of the AVHDD 12. The battery capacity information is information regarding the battery of the AVHDD 12 and includes information indicating a maximum capacity, a remaining capacity, a maximum usable time and a remaining usable time of the battery 125. On the other hand, the storage capacity information is information regarding a storage capacity of the AVHDD 12 and includes a maximum storage capacity and a remaining storage capacity of the hard disk unit 124.

On the other hand, as shown in FIG. 1, the DVC 11 includes a digital interface section (referred to as "DIF section" hereinafter) 111, a register space 112, a control unit 113 and a display unit 114.

The DIF section 111 is a digital interface conforming to IEEE Std 1394-1995 as one of standards regarding a serial bus and standards (IEEE Std 1394a-2000 and the like) associated with such a standard.

The register space 112 is a part of a CSR (control and status register) architecture stipulated in ISO/IEC 13213:1994 and serves to store information regarding the DVC 11. Further, the register space 112 has a response register if the DVC 11 supports the FCP system which will be described later and a BSW register if the DVC supports a WT system which will be described later.

The control unit 113 includes a microcomputer and a memory. A control program for controlling various functions of the DVC 11 is stored in the memory of the control unit 113. A control program for controlling a processing procedure of the DVC 11 which will be described with reference to FIGS. 2 to 8 is also stored in the memory of the control unit 113.

Further, the control unit 113 has a function for acquiring latest battery capacity information and storage capacity information of the AVHDD 12. Further, the control unit 113 has a function for detecting latest conditions of the battery and the storage capacity of the AVHDD 12 from the battery capacity information and the storage capacity information and for displaying such conditions on the display unit 114. The control unit 113 serves to display the conditions of the battery and the storage capacity of the AVHDD 12 on the same screen simultaneously or alternately. When the condition of the battery of the AVHDD 12 is displayed, the control unit 113 displays the maximum storage capacity, remaining capacity, maximum usable time and remaining usable time of the battery of the AVHDD 12 on the same screen simultaneously or alternately. When the storage capacity of the AVHDD 12 is displayed, the control unit 113 displays the maximum storage capacity and the remaining storage capacity of the storage capacity of the AVHDD 12 on the same screen simultaneously or alternately.

Next, the FCP system which is one of capacity information acquiring systems will be explained with reference to FIG. 6.

The FCP system is a system in which inquiry command is transmitted and inquiry response is received by using FCP (function control protocol) stipulated in IEC 61883-1. The inquiry command is command for requesting the latest battery capacity information and storage capacity information of the AVHDD 12. On the other hand, the inquiry response is response corresponding to the inquiry command and includes the latest battery capacity information and storage capacity information of the AVHDD 12.

(1) The control unit 113 generates the inquiry command and supplies the command to the DIF section 111. Such processing is carried out if a predetermined time period has elapsed or if bus reset has occurred or if user manipulation (start of imaging, temporary pause or the like) is detected.

(2) The DIF section 111 transmits the inquiry command to the AVHDD 12.

(3) The DIF section 121 receives the inquiry command from the DVC 11 and writes the command in a command register 61.

(4) The control unit 123 reads out the inquiry command from the command register 61 and then generates read response including the latest battery capacity information and storage capacity information of the AVHDD 12 and supplies such response to the DIF section 121.

(5) The DIF section 121 returns the inquiry response to the DVC 11.

(6) The DIF section 111 receives the inquiry response from the AVHDD 12 and writes such response in a response register 62.

(7) The control unit 113 reads out the inquiry response from the response register 61 and then acquires the latest battery capacity information and storage capacity information of the AVHDD 12. Then, the control unit 113 detects the conditions of the battery and the storage capacity of the AVHDD 12 from the battery capacity information and the storage capacity information and displays such conditions on the display unit 114.

Figure 7:
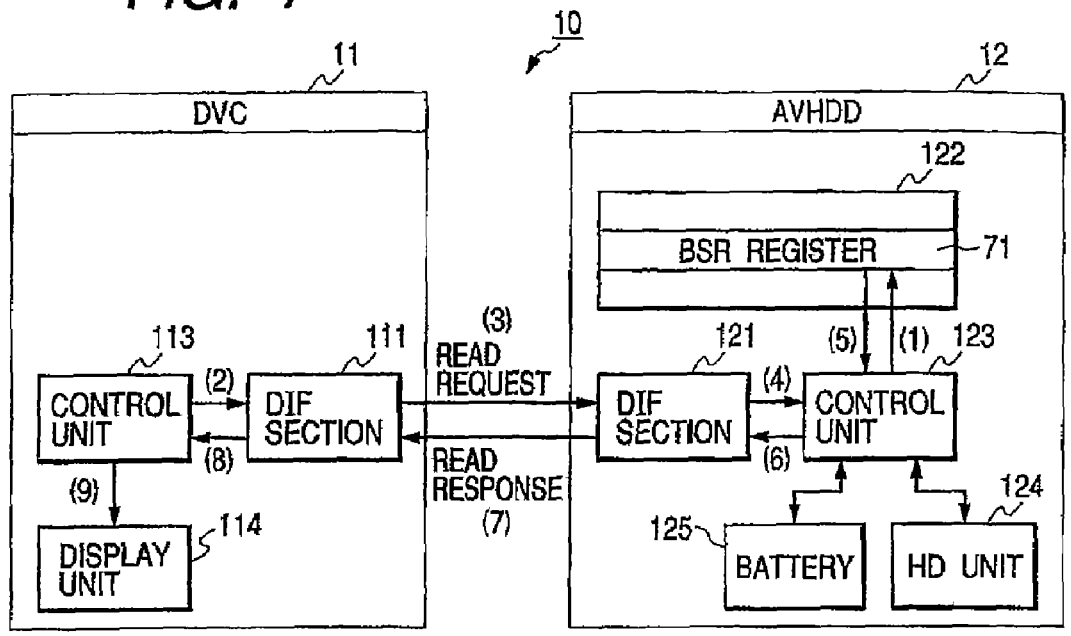
FIG. 7 is a view for explaining the RT system.

Next, the RT system which is one of the capacity information acquiring systems will be explained with reference to FIG. 7.

The RT system is a system which reads out the latest battery capacity information and storage capacity information of the AVHDD 12 from a BSR register 71 in the register space 122 of the AVHDD 12 by using read transaction stipulated in IEEE Std 1394-1995.

(1) The control unit 123 detects the latest battery capacity information and storage capacity information of the AVHDD 12 and stores such information in the BSR register 71. Such processing is carried out if the remaining storage capacity and the remaining usable time of the battery 125 exceed a predetermined reference value and if the remaining storage capacity of the hard disk unit 124 exceeds a predetermined reference value.

(2) The control unit 113 generates read request for requesting reading-out of the BSR register 71 to the AVHDD 12 and supplies such request to the DIF section 111. Such processing is carried out if a predetermined time period has elapsed or if bus reset has occurred or if the user manipulation (start of imaging, temporary pause or the like) is detected.

(3) The DIF section 111 transmits the read request to the AVHDD 12.

(4) The DIF section 121 receives the read request from the DVC 11 and supplies such read request to the control unit 123.

(5) The control unit 123 reads out the latest battery capacity information and storage capacity information of the AVHDD 12 from the BSR register 71.

(6) The control unit 123 generates read response including the battery capacity information and the storage capacity information read out from the BSR register 71 and supplies such read response to the DIF section 121.

(7) The DIF section 121 transmits the read response to the DVC 11.

(8) The DIF section 111 receives the read response from the AVHDD 12 and supplies such read response to the control unit 113.

(9) The control unit 113 acquires the latest battery capacity information and storage capacity information of the AVHDD 12 from the read response. Then, the control unit 113 detects the conditions of the battery and the storage capacity of the AVHDD 12 from the battery capacity information and the storage capacity information and displays such information on the display unit 114.

Figure 8:
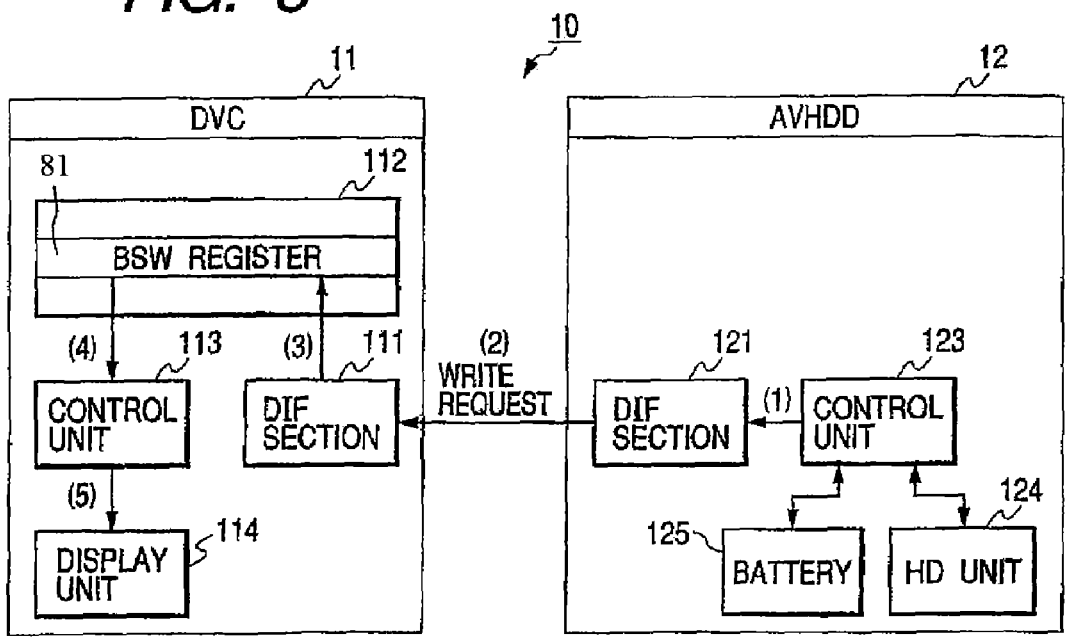
FIG. 8 is a view for explaining the WT system.

Next, the WT system which is one of the capacity information acquiring systems will be explained with reference to FIG. 8.

The WT system is a system which writes the latest battery capacity information and storage capacity information of the AVHDD 12 in a BSW register 81 in the register space 112 of the DVC 11 by using write transaction stipulated in the IEEE Std 1394-1995.

(1) The control unit 123 generates write request for requesting writing of the latest battery capacity information and storage capacity information of the AVHDD 12 in the BSW register 81 and supplies such write request to the DIF section 121. Such processing is carried out if the remaining storage capacity and the remaining usable time of the battery 125 exceed a predetermined reference value and if the remaining storage capacity of the hard disk unit 124 exceeds a predetermined reference value.

(2) The DIF section 121 transmits the write request to the DVC 11.

(3) The DIF section 111 receives the write request from the AVHDD 12 and writes such write request in the BSW register 81. By repeating the processing operations (1) to (3), the latest battery capacity information and storage capacity information are always stored in the BSW register 81.

(4) The control unit 113 acquires the latest battery capacity information and storage capacity information of the AVHDD 12 from the BSW register 81. Such processing is carried out if a predetermined time period has elapsed or if bus reset has occurred or if the user manipulation (start of imaging, temporary pause or the like) is detected.

(5) The control unit 113 detects the conditions of the battery and the storage capacity of AVHDD 12 from the battery capacity information and the storage capacity information, and displays such conditions on the display unit 114.

Now, a processing procedure of the digital video camera system 10 will be explained with reference to FIGS. 2 to 5.

Step S201: The control unit 113 inquires of the AVHDD 12 about the capacity information acquiring system supported by the AVHDD 12.

Step S202: The control unit 113 judges whether the FCP system is used or not. If the AVHDD 12 supports the FCP system and the control unit 113 selects the FCP system, the flow chart goes to a step S2021.

Step S203: The control unit 113 judges whether the RT system is used or not. If the AVHDD 12 supports the RT system and the control unit 113 selects the RT system, the flow chart goes to a step S2031.

Step S204: The control unit 113 judges whether the WT system is used or not. If the AVHDD 12 supports the WT system and the control unit 113 selects the WT system, the flow chart goes to a step S2041.

Step S2021: The control unit 113 generates the above-mentioned inquiry command and supplies such command to the DIF section 111. The DIF section 111 transmits the inquiry command to the AVHDD 12. The DIF section 121 receives the inquiry command from the DVC 11 and writes such inquiry command in the command register 61 in the register space 122. The inquiry command written in the command register 61 is supplied to the control unit 123.

Step S2022: The control unit 123 generates the read response storing the latest battery capacity information and storage capacity information of the AVHDD 12 and supplies such response to the DIF section 121. The DIF section 121 returns the inquiry response to the DVC 11. The DIF section 111 receives the inquiry response from the AVHDD 12 and writes such inquiry response in the response register 62 in the register space 112. The inquiry response written in the response register 62 is supplied to the control unit 113.

Step S2023: The control unit 113 acquires the latest battery capacity information and storage capacity information of the AVHDD 12 from the inquiry response.

Step S2024: The control unit 113 detects the condition of the battery of the AVHDD 12 from the latest battery capacity information and displays such a condition on the display unit 114. In this case, the control unit displays the maximum storage capacity, remaining storage capacity, maximum usable time and remaining usable time of the battery of the AVHDD 12 on the same screen of the display unit 114 simultaneously or alternately. The user can recognize the condition of the battery of the AVHDD 12 by looking at the display unit 114.

Step S2025: The control unit 113 detects the condition of the storage capacity of the AVHDD 12 from the latest storage capacity information and displays such a condition on the display unit 114. In this case, the control unit 113 displays the maximum storage capacity and remaining storage capacity of the storage capacity of the AVHDD 12 on the same screen of the display unit 114 simultaneously or alternately. The user can recognize the condition of the storage capacity of the AVHDD 12 by looking at the display unit 114.

Step S2026: The control unit 113 judges whether AVHDD 12 is still connected to the DVC 11 or not. If the AVHDD 12 is disconnected from the DVC 11 physically or logically, the flow chart is ended.

Step S2031: The control unit 113 generates the read request for requesting the reading-out of the BSR register 71 to the AVHDD 12 and supplies such read request to the DIF section 111. The DIF section 111 transmits the read request to the AVHDD 12. The DIF section 121 receives the read request from the DVC 11 and supplies such read request to the control unit 123.

Step S2032: The control unit 123 reads out the latest battery capacity information and storage capacity information of the AVHDD 12 from the BSR register 71 and generates the read response that stored such information. The DIF section 121 transmits the read response to the DVC 11. The DIF section 111 receives the read response from the AVHDD 12 and supplies such read response to the control unit 113.

Step S2033: The control unit 113 acquires the latest battery capacity information and storage capacity information of the AVHDD 12 from the read response.

Step S2034: The control unit 113 detects the condition of the battery of the AVHDD 12 from the latest battery capacity information and displays such a condition on the display unit 114. In this case, the control unit 113 displays the maximum storage capacity, remaining storage capacity, maximum usable time and remaining usable time of the battery of the AVHDD 12 on the same screen of the display unit 114 simultaneously or alternately. The user can recognize the condition of the battery of the AVHDD 12 by looking at the display unit 114.

Step S2035: The control unit 113 detects the condition of the storage capacity of the AVHDD 12 from the latest storage capacity information and displays such a condition on the display unit 114. In this case, the control unit 113 displays the maximum storage capacity and the remaining storage capacity of the storage capacity of the AVHDD 12 on the same screen of the display unit 114 simultaneously or alternately. The user can recognize the condition of the storage capacity of the AVHDD 12 by looking at the display unit 114.

Step S2036: The control unit 113 judges whether the AVHDD 12 is still connected to the DVC 11 or not. If the AVHDD 12 is disconnected from the DVC 11 physically or logically, the flow chart is ended.

Step S2041: The control unit 113 acquires the latest battery capacity information and storage capacity information of the AVHDD 12 from the BSW register 81.

Step S2042: The control unit 113 detects the condition of the battery of the AVHDD 12 from the latest battery capacity information and displays such a condition on the display unit 114. In this case, the control unit 113 displays the maximum storage capacity, remaining storage capacity, maximum usable time and remaining usable time of the battery of the AVHDD 12 on the same screen of the display unit 114 simultaneously or alternately. The user can recognize the condition of the battery of the AVHDD 12 by looking at the display unit 114.

Step S2043: The control unit 113 detects the condition of the storage capacity of the AVHDD 12 from the latest storage capacity information and displays such a condition on the display unit 114. In this case, the control unit 113 displays the maximum storage capacity and the remaining storage capacity of the storage capacity of the AVHDD 12 on the same screen of the display unit 114 simultaneously or alternately. The user can recognize the condition of the storage capacity of the AVHDD 12 by looking at the display unit 114.

Step S2044: The control unit 113 judges whether the AVHDD 12 is still connected to the DVC 11 or not. If the AVHDD 12 is disconnected from the DVC 11 physically or logically, the flow chart is ended.

In this way, according to the DVC 11 of the illustrated embodiment, even when the AVHDD 12 supports either of the FCP system, RT system or WT system, the latest battery capacity information and storage capacity information of the AVHDD 12 can be obtained.

Further, according to the DVC 11 of the illustrated embodiment, since the conditions of the battery and the storage capacity of the AVHDD 12 can be displayed, the user can recognize the conditions of the battery and the storage capacity of the AVHDD 12, with the result that the record of the photo-taken image can be prevented from suddenly becoming impossible. Further, the conditions of the battery and the storage capacity of the AVHDD 12 can be ascertained without looking up from the subject.

The above-described preferred embodiments are merely exemplary of the present invention, and are not be construed to limit the scope of the present invention.

For example, the present invention is not limited to the AV hard disk device, but can also be applied to a removable storage device other than the AV hard disk device.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An imaging apparatus comprising:
   a register;
   a communication unit which receives a write request from an external storage device via a serial bus, the write request being used to write battery capacity information and storage capacity information in said register;
   a control unit which (a) obtains the battery capacity information and the storage capacity information from said register if a bus reset occurs, (b) detects a condition of a battery of the external storage device using the battery capacity information obtained from said register, and (c) detects a condition of the storage capacity of the external storage device using the storage capacity information obtained from said register; and
   a display unit which (a) displays the condition of the battery detected by the control unit, and (b) displays the condition of the storage capacity detected by the control unit.

2. An imaging apparatus according to claim 1, wherein the condition of the battery of the external storage device includes a remaining capacity of the battery of the external storage device or a remaining usable time of the battery of the external storage device.

3. An imaging apparatus according to claim 1, wherein said communication unit conforms to IEEE Std 1394-1995.

4. An imaging apparatus according to claim 1, wherein the condition of the storage capacity of the external storage device includes a remaining storage capacity of the external storage device.

5. An imaging apparatus according to claim 1, wherein the condition of the battery of the external storage device includes a remaining capacity of the battery of the external storage device or a remaining usable time of the battery of the external storage device, and
   wherein the condition of the storage capacity of the external storage device includes a remaining storage capacity of the external storage device.

6. An imaging apparatus according to claim 1, wherein the imaging apparatus includes a camera.

* * * * *